(No Model.)  7 Sheets—Sheet 1.
G. BOEMERMANN.
CASH REGISTER, INDICATOR, RECORDER, AND CHECK PRINTER.
No. 498,615. Patented May 30. 1893.

WITNESSES:
D. N. Hayword,
Peter A. Ross

INVENTOR:
George Boemermann.
By Henry Connett
Attorney.

(No Model.) 7 Sheets—Sheet 4.
G. BOEMERMANN.
CASH REGISTER, INDICATOR, RECORDER, AND CHECK PRINTER.
No. 498,615. Patented May 30, 1893.
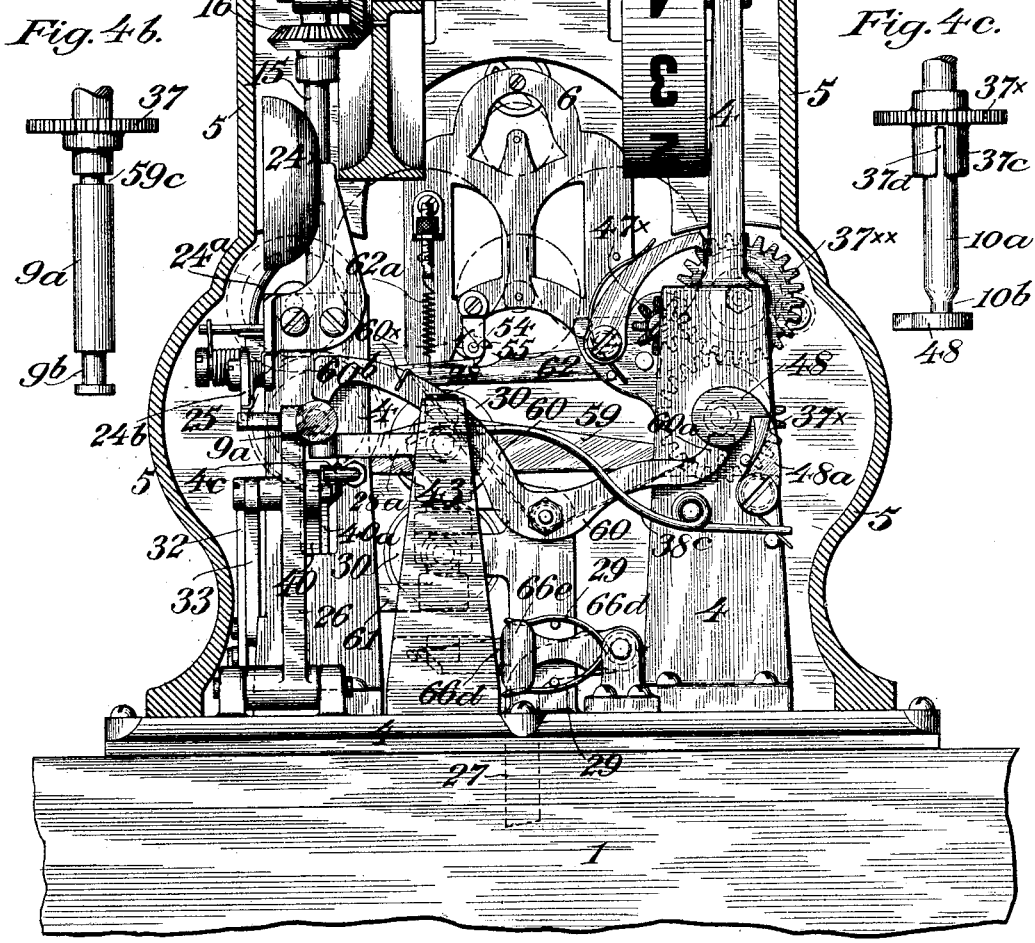
Fig. 4.
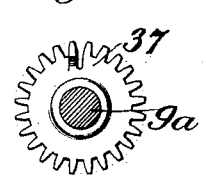
Fig. 4a.
Fig. 4b.
Fig. 4c.
WITNESSES:
D. H. Haywood
Peter A. Ross
INVENTOR:
George Boemermann
By Henry Connett
Attorney.

(No Model.) 7 Sheets—Sheet 5.
G. BOEMERMANN.
CASH REGISTER, INDICATOR, RECORDER, AND CHECK PRINTER.
No. 498,615. Patented May 30, 1893.

WITNESSES:
D. N. Hayward
Peter A. Ross

INVENTOR:
George Boemermann
By Henry Connett
Attorney.

(No Model.) 7 Sheets—Sheet 6.
G. BOEMERMANN.
CASH REGISTER, INDICATOR, RECORDER, AND CHECK PRINTER.
No. 498,615. Patented May 30, 1893.
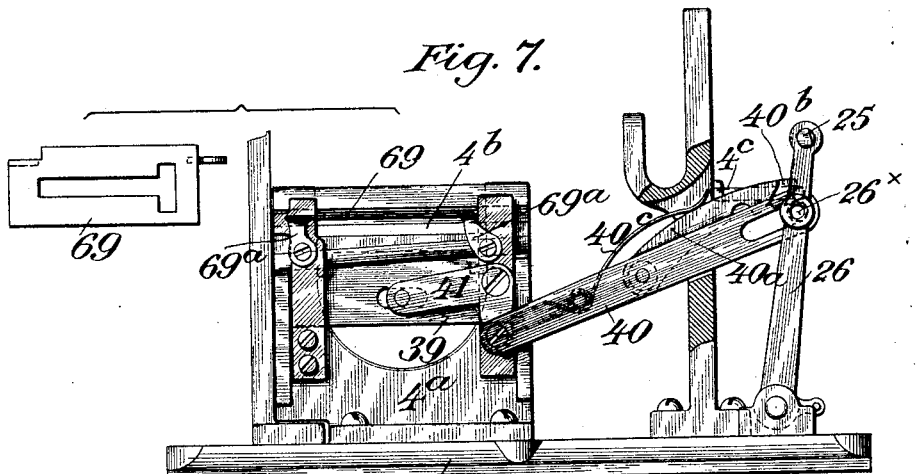
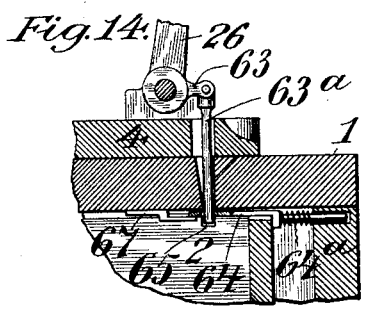
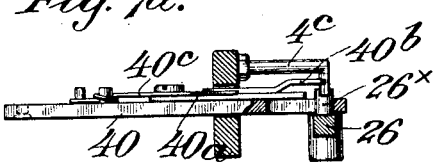
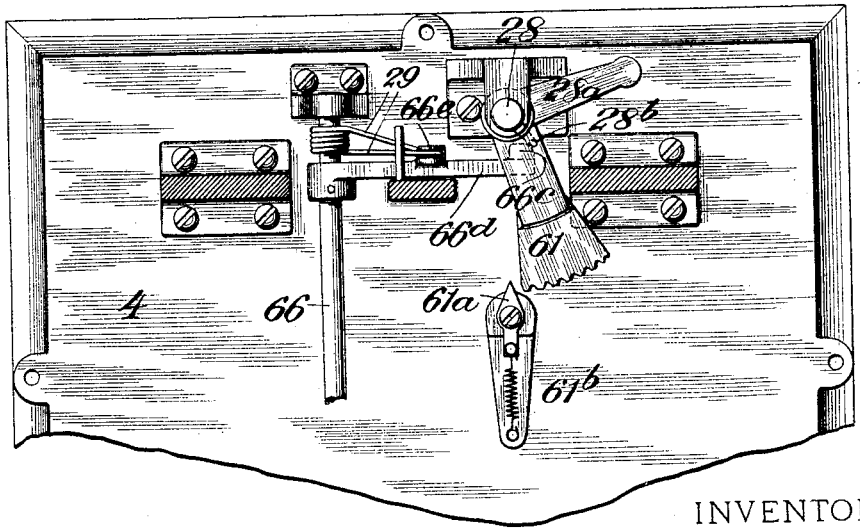
WITNESSES:
D. N. Haywood
Peter A. Ross
INVENTOR:
George Boemermann
By Henry Connett
Attorney.

(No Model.) 7 Sheets—Sheet 7.
G. BOEMERMANN.
CASH REGISTER, INDICATOR, RECORDER, AND CHECK PRINTER.
No. 498,615. Patented May 30, 1893.
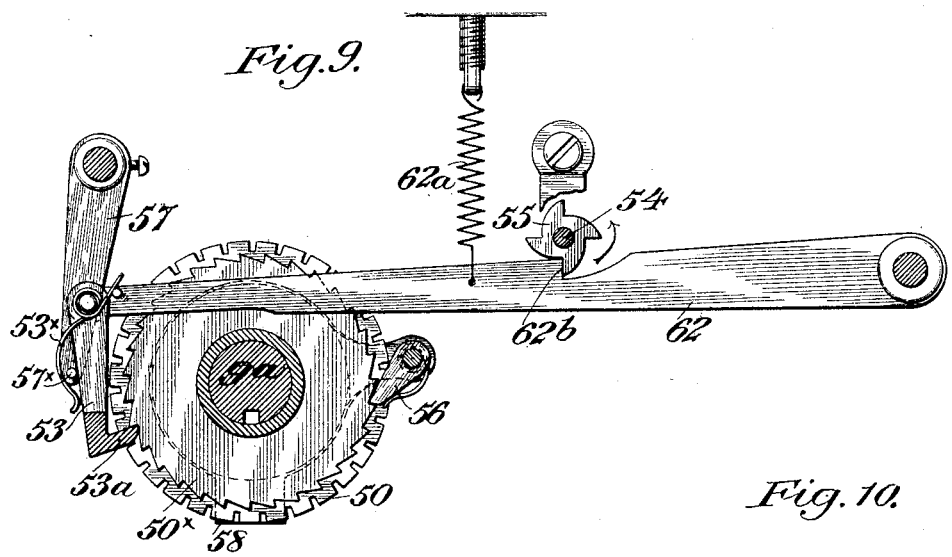
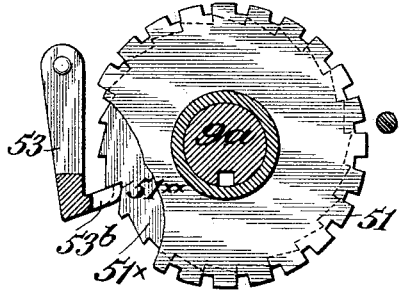
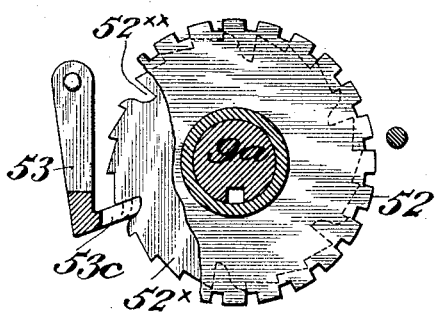
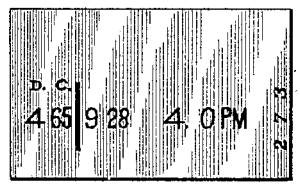
WITNESSES:
D. H. Hayford
Peter A. Ross
INVENTOR:
George Boemermann
By Henry Connell
Attorney.

UNITED STATES PATENT OFFICE.

GEORGE BOEMERMANN, OF BROOKLYN, NEW YORK.

CASH REGISTER, INDICATOR, RECORDER, AND CHECK-PRINTER.

SPECIFICATION forming part of Letters Patent No. 498,615, dated May 30, 1893.

Application filed October 31, 1892. Serial No. 450,421. (No model.)

*To all whom it may concern:*

Be it known that I, GEORGE BOEMERMANN, a citizen of the United States, residing at Brooklyn, in the county of Kings and State of New York, have invented certain new and useful Improvements in Cash-Registers, of which the following is a specification.

My invention relates to the class of machines or apparatuses employed to register and indicate the amounts received from sales, to add up such amounts, to print the amount of each sale in numerals on a slip or ticket, &c., and it is embodied in a machine or apparatus which effects the following objects, namely: by rotating a pull or pulls, conspicuous numerals designating the sum in cash received, are displayed and type wheels are set for printing the amount on a ticket; by drawing out the pull, or that pull designated the "master pull," a gong is sounded, a cash drawer is unlocked and protruded, and the sum received, together with the date and time it was received, is printed on a ticket which is simultaneously cut off from a strip. When the pull is turned back again to zero, the sum received is added up on an adding machine within the casing, and when the pull is pushed in "home," the strip from which the tickets are cut is fed forward under the printing wheels ready for the next printing operations.

One of the characteristic and important features of my machine is the incorporation therewith in a novel manner of a clock mechanism which actuates the type-wheels which print the date and time in numerals on the ticket.

The primary operating element of the machine is a pull which I call the "master pull." This pull controls the gong, the drawer-lock, the printing mechanism, and the adding and display mechanisms and type-wheel for the "cents" of the purchase; that is the sums five cents, ten cents, fifteen cents, &c., up to ninety-five cents. There is another pull which I call, for convenience, a "dollar pull;" this pull controls the type-wheel for printing the "dollars" of a purchase, and the separate mechanism for adding up the dollars received. There may be more than one of these "dollar" pulls, but I have only shown one in the machine illustrated herein. I have shown the "dollar" pull herein as controlling the printing on the ticket of the words "Quart" and "Pint," as will be hereinafter described.

The machine will be fully described hereinafter and its novel features defined in the claims.

In the accompanying drawings—Figure 1 is a front elevation, on a comparatively small scale, of a machine embodying my improvements. Fig. 2 is an elevation of the right-hand side of the machine with the casing in section. The type-wheels and a part of the pull-spindle and stop-mechanism are also in section in the plane of the axis of the master pull. Fig. $2^a$ is a transverse sectional detail of the printing roller and flanged track. Fig. 3 is an elevation of the left-hand side of the machine with the casing in section. In both Figs. 2 and 3, the cash drawer and its housing are seen in section. Fig. 4 is a rear elevation of the machine with the casing in section. Figs. $4^a$, $4^b$ and $4^c$ are details of the construction which will be referred to hereinafter. Fig. 5 is a sectional, illustrative view which will be explained hereinafter. Fig. 6 is a sectional view mainly illustrative of the stop-devices connected with the pulls. Fig. 7 is a face view of the mechanism for severing the printed ticket or check from the strip, detached; and Fig. $7^a$ is a plan view of the lever mechanism of said severing mechanism. Fig. 8 is a detached plan view of the mechanism for locking and unlocking the cash-drawer and of some of the adjacent mechanism. Figs. 9, 10, 11 and 12 are detail views on a larger scale of the type-wheels and of the mechanism whereby the clock or timepiece operates the type-wheels for printing on the ticket the number of the day of the month and the time of day. Fig. 13 represents the ticket or check printed by the apparatus. Fig. 14 is a detail view of a preventive device which will be hereinafter described.

1 is a suitable base or housing for the cash-drawer, 2. This drawer is adapted to be pushed out, when released, by a spring, as in other apparatuses of this class; or it may be so mounted as to run out by gravity when released. The drawer may have rollers at its top and inner end, as seen at 3 in Figs. 2 and 3, to roll on the under surface of the cover of its housing, and rest and roll on rollers $3^a$, seen in Fig. 2, mounted in the bottom of the housing. These will cause it to move in and out more freely.

On the cover or top of the housing is mounted a suitable frame, 4, to form a support and bearings for the internal mechanism of the apparatus, and fixed to this frame is a casing, 5, ordinarily of thinner material, which wholly incloses and protects the mechanism.

Fig. 1 shows the form and arrangement I prefer to employ. Centrally situated is the face or dial of the clock, 6, which operates the type-wheels for printing the time and the date, or a part of the date. At the left is a reel, 7, which carries a strip of paper, 8, from which the ticket or check seen in Fig. 13 is cut. The reel 7ˣ, seen at the right in Fig. 1, is only employed for reeling up the strip in case it is preferred not to cut it up into tickets. It has no other function and may be omitted when a cutter is used. At the right is seen the "master pull," 9, and at the left, the "dollar pull," 10. Above the clock are seen the sight-apertures, 11, and 11ª, the one at the left exhibiting the amount indicated by the "dollar" pull and the one at the right exhibiting the amount indicated by the master, or "cents" pull.

On a rod 12, (Figs. 2, 3 and 4), mounted in the frame is the display "cents" wheel, 13, which has marked on its peripheral face, in conspicuous figures, the cipher "0" and numbers, "5," "10," "15," &c., up to "95," and these may be brought in succession before the sight-aperture 11ª, by the rotation of the wheel 13; and this rotation may be effected by the rotation of the master pull 9, through the medium of the spindle, 9ª, of this pull, and suitable intermediate gearing. As here shown, this gearing comprises a bevel wheel, 14, splined on the pull-spindle, which wheel gears with a bevel wheel, 14ª, on an upright shaft, 15, and a bevel wheel, 16, on the upper end of the shaft 15, which gears with a bevel wheel 16ª, fixed to the display wheel 13. Normally the master pull and its spindle may be rotated freely so as to set the wheel 13 in any position desired; but as it is not easy to rotate the pull to just the right point, especially where the operator is hurried, I employ in connection with the pull a stop-mechanism, which I will describe with especial reference to Figs. 1, 2 and 6.

Splined on the pull-spindle, 9ª, is a carrier, 17, in which are mounted flat-bodied push-pins, 18, which may be pushed in or drawn out, at will. In order, however, to hold the pin steady in its two positions and prevent accidental disarrangements, it has in its under side two recesses, as seen in Fig. 2, one of which is engaged by the rounded end of a spring detent, 19, when the pin is pushed in, and the other is engaged by said detent when the pin is pushed or pulled out and in its normal position. The detents are set in sockets or recesses in the carrier as clearly shown.

The push-pins are arranged concentrically about the pull-spindle and equally spaced, and each pin has a button or head on which is marked a number which corresponds to one of the numbers on the display wheel 13; that is, one of the push-pins bears a cipher "0," and the others bear the number "5," "10," "15," &c., as seen in Fig. 1. Now, when the push-pin marked "0" is pushed in and the master pull turned to the right until the pin stops it, the "0" mark will appear at the aperture 11ª, and the push-pin "0" will be at the top or over the pull, as seen in Fig. 1. If the operator wishes to display the number "25," for example, at the sight aperture 11ª, he grasps the master-pull and at the same time pushes in the pin marked "25" with his thumb; he then turns the pull to the right and when the pin reaches the stopping point so that the pull can be turned no farther, the number "25" on wheel 13, will be displayed as desired.

The mechanism whereby the push-pin effects the arrest or stoppage of the pull at the proper point is illustrated in Figs. 2 and 6. Fixed to the inner face of the carrier 17 is a ratchet wheel, 20, which has twenty teeth, or one for each of the twenty push-pins, and on the frame, just above said wheel, is pivotally mounted a lever-pawl 21, the head of which is held normally out of engagement with the teeth of the ratchet wheel 20 by the weight of its tail. But when one of the push-pins at the left is pushed in and the pull rotated to the right, as before explained, the inner, protruding end of said pin finds in its path a projecting wiper-cam, 22, on the tail of the pawl. As the pin wipes under this cam it raises the tail of the pawl and causes its head to instantly engage a tooth of the ratchet wheel 20, and thus arrest the further rotation of the pull. In Fig. 6 a push-pin, 18, is seen in section at the stopping point under the cam 22, and the pawl engaging the tooth of the ratchet. In reaching the position seen in Fig. 6, the push-pin must wipe under the head of a gravity latch 23, also pivoted on the frame, and when the pull is rotated back,—to the left,—as it must be before it is pushed in, the protruded inner end of the push-pin wipes over a lateral bevel or incline, 23ª, on the head of the latch 23, which serves to push the pin out or back again to its normal position. The principal object of this ratchet device is to avoid the use of the push-pin itself as a stop by having it impinge against a stud or the like. The pin, which is comparatively fragile, would be liable to injury. The push-pins may be withdrawn by hand, if desired, and this may be necessary if the operator should push in the wrong pin. It is not essential that the tail of the lever-pawl shall fall by gravity; the pawl may be frictionally mounted so that when the ratchet wheel 20 is rotated backward (to the left) the pawl will be raised out of engagement by the teeth thereof. We will suppose that the operator has pushed in the pin marked "25," as before stated, and turned the master pull to the right until it will turn no farther. This rotation of the pull and its spindle serves to set the "cents" type-wheel, 24 belonging to this pull. This wheel (seen in Figs. 2 and 10) is splined on the pull-spindle $9^a$, and turns with the latter, thereby carrying the numeral "25" on this wheel to the under side thereof in position to print as will be hereinafter explained.

The next step of the operator is to draw out the master pull as far as it can be drawn. This produces several results which are nearly simultaneous. One of these is to sound a bell or gong, $24^x$, seen best in Fig. 2. This bell has the ordinary spring hammer, $24^a$, which is drawn back and released by a pin or stud, 25, on the upper end of a lever 26, fulcrumed at its lower end on the frame and engaging, at its upper end, a circumferential groove, $9^b$, in the rear end of the pull-spindle $9^a$. When the pull is drawn out, the pin 25, engages one arm of a spring trip, $24^b$, the other arm of which acts on the heel of the hammer, to draw the latter back.

Another result of drawing out the pull is to unlock and release the cash drawer 2. The mechanism for locking and unlocking the drawer is best seen in Figs. 3, 4, 5, 6 and 8. A rock shaft 66, is situated in the lower part of the frame, and on this shaft is fixed an arm, $66^a$, having in it a pin, $66^b$, which takes under a bent latch, 27, loosely hung on the shaft. The free end of this latch depends through an aperture in the top of the housing 1, and engages, when the drawer is pushed in, a locking notch, $2^a$, in some part of the drawer 2. This device is seen in Figs. 3 and 6. At the back of the frame is mounted an upright rock-shaft, 28, to which is fixed an arm $28^a$, the end of which engages the groove $9^b$, in the pull-spindle, whereby, when the pull is drawn out, the shaft 28 is rocked on its axis. On the lower part of this shaft 28 is a short arm or stud, $28^b$, (see Fig. 5) which is so arranged as to wipe under an inclined cam-stud, $66^c$, on an arm $66^d$, fixed on the shaft 66, when the pull 9 is drawn out and thus momentarily rock the shaft 66, and cause the pin $66^b$, to lift the bent latch 27 (Fig. 6), and thus free the cash drawer. When the arm $28^b$ passes the cam-stud $66^c$, the latch again falls, and is ready to automatically lock the drawer as soon as the latter is pushed in. The arm $66^d$ (see Figs. 4 and 8) has on it a lateral boss, $66^e$, which is embraced above and below between two springs, 29, whereby the shaft 66 is held in a normal position but may be rotated to a limited extent either way by pressing up or down on the arm $66^d$. This enables the arm $28^b$ to wipe over the cam-stud $66^c$, and depress the arm $66^d$, when the pull 9 is pushed in home, without in any way affecting the latch 27. The purpose of this construction, it will be seen, is to allow the latch 27 to be lifted momentarily and then dropped again, in which position it remains until the pull is again drawn out.

Another result of drawing out the master pull is to effect the printing of the ticket or check seen in Fig. 13. The strip of paper, 8 is led from the reel 7, through a guide, $7^a$, between two feed-rollers, 30, and thence out to the right side of the machine (see Figs. 2 and 6), where its end projects out over the cutter blade (to be described hereinafter) and under a thin apertured or slotted plate 69 arranged under the type-wheels. This plate is rather loosely mounted on the cutter frame by lugs, $69^a$, as seen in Fig. 7, and the slot therein is coincident with the lower row of types on the several printing wheels so that the paper to form the ticket, which is below or under said plate, may be printed on through the slot in the latter. Over the apertured plate and under the type-wheels is arranged an ordinary inking ribbon, 70, such as is used on type writers. This ribbon (see Fig. 2) is unwound from a spool $70^a$, and onto a ratcheted spool $70^b$. The printing is effected by a roller 31, which rolls along the under side of ticket as the master pull 9 is drawn out and presses the ticket and ribbon upwardly against the faces of the type on the several type-wheels.

I may say here that all the matter on the ticket seen in Fig. 13 is printed thereon as follows: The letters "D. C." and the upright division bar, are printed from a stationary type; the "dollar" numeral "4" is printed from a "dollar" type-wheel; the number "65" is printed from the "cents" type-wheel, 24; the numeral "9" is printed from a "months" type-wheel; the number "28" is printed from a "day" type wheel; the characters "4" and "P. M." are printed from two connected "hour" wheels; the character "0" is printed from a "minute" type wheel, and is printed from an ordinary consecutive numbering machine. These features will be hereinafter described. The roller 31 is carried by a rod, $31^a$, pivotally coupled to a rocking arm 32; and this rocking arm 32 is coupled by a link, 33, to the operating lever 26. The manner of arranging this link, as clearly shown in Fig. 2, causes a moderate extent of movement of the lever 26, to impart a much greater extent of movement to the arm 32, and through it, to the roller 31. As the roller 31 starts forward, its journal rolls up a short incline on a flanged track 34, (see Fig. $2^a$) which causes the roller to press upon the paper and insure the proper degree of impression for printing, and afterward the journal moves along the upper face of said track. After the roller has passed off from the ticket, and the pull 9 is nearly drawn out, the journal of the roller passes off from the front end of the flanged track and falls to a lower level so as to move back under the track when the pull is pushed in. A detent stud, $32^a$, in the arm 32, takes under the rod $31^a$ and thus limits the descent of the roller.

I may say here that the track 34 is hinged or pivoted at its front end to the frame and is supported at its rear or inner end by a leg, 34ª, which rests on the bed-piece of the frame. This construction allows the track to lift slightly when the journal of the roller moves back under it, whereby, when the roller is drawn back to the normal position seen in Fig. 2, the stud 32ª may lift the rod 31ª, and with it the roller; thus when the journal of the retracted roller passes out from under the end of the flanged track, the latter (which has been slightly elevated) falls and leaves the roller in the proper position to advance, as already explained.

As the end of the paper strip destined to form the ticket must be free to fall when printed and cut off, it must be below all the parts and is therefore somewhat liable to bend or curl downward; and in order that it may be upheld, especially at the inner end of the ticket, so that the impression roller 31 will be sure to take under it, I provide a precautionary device which will now be described with especial reference to Figs. 2 and 2ª. A T-headed upright, 35, which is mounted on the free end of a horizontal rocking arm 35ª, takes under the strip of paper near the cutter and holds the strip up to the plate 69, so that when the impression roller advances it will be sure to take under the strip. The rocking arm 35ª is pivoted on the same axis with the rocking arm 32, and this arm plays between two pins, 35ᵇ and 35ᶜ on the arm 35ª whereby the rocking arm 32, when drawn back, throws up the T-headed upright 35, and when said arm is pushed forward it will, at the latter part of its movement, depress said upright and allow the severed ticket to fall. The arm 35ª is held in both of its positions by a spring 35ᵈ, which engages a shoulder on the upper part of the arm.

The inking ribbon is shifted after each printing operation by means of a hook pawl 70ᶜ, which engages the teeth on the ratcheted spool 70ᵇ; this pawl being coupled to the rocking arm 32, it follows that the pawl will be advanced when the pull 9 is drawn out, and when the pull is pushed in, it will engage and rotate the ratcheted spool. A spring, 70ᵈ, holds the pawl up in engagement with the teeth in the spool, which is stopped against backward rotation by a stop-pawl 70ᶜ, in the usual way.

I will say that the machine, or device, for printing the numbers consecutively on the tickets, and which is seen at 36, in Figs. 2 and 10, is a well known device, purchasable in the market, and will need no description. It is set or shifted at each printing operation by means of an operating cam-arm, 36ª, which, on the drawing out of the pull, is impinged upon by a toothed wheel, 37, fixed on the pull spindle 9ª. This cam-arm is not, however, actuated until after the printing of the number has been effected and the impression roller has passed the numbering device 36.

The mechanism for severing the ticket from the strip 8, will now be described with especial reference to Figs. 7 and 7ª. In an auxiliary part, 4ª, of the frame 4, is formed a slit or transverse aperture, 4ᵇ, through which the end of the strip 8 passes on its way from the feeding rollers 30. The course of the strip is indicated by dotted lines in Fig. 6. The metal of the frame forming the upper margin of this slit is the stationary blade of the cutter, and the movable cutter blade, 39, is mounted to play up and down in guides or keepers on the face of the frame 4ª. This blade moves upward in cutting. The blade 39 is operated from the rocking lever 26, through the medium of a link 40, and a bell-crank or elbow-lever, 41, fulcrumed on the cutter frame 4ª. The pendent arm of the lever 41 is coupled to the link 40, and the other arm has a slotted connection with the blade 39. The link 40 has a slotted coupling to the lever 26, whereby, when the pull 9 is drawn out, the lever 26 will not act on the cutter blade during the first part of the movement of the pull. When the lever does act on the blade it operates it quickly and the blade severs the ticket from the strip 8 at the moment the pull is wholly drawn out.

It will be necessary to digress here from the description of the consecutive operations of the apparatus to say that the feed-rollers 30 are operated to feed the strip forward for the next ticket, by the pushing in of the pull 9, and as this pushing in of the pull also draws down or retracts the blade 39, it is necessary to provide for the withdrawal of the blade at the beginning of the inward movement of the pull in order that it may get out of the way of the strip to be fed. Therefore, in order to nullify the effect of the slotted connection of the link 40 with the lever 26, and thus enable the lever to act promptly in the withdrawal of the blade, I employ the device illustrated in Figs. 7 and 7ª, and which will now be described. On the link 40 is pivotally mounted a hook, 40ª, and on the free end of this hook is secured, as an extension, a cam, 40ᵇ, having a beveled or inclined nose. When the pull 9 is pushed in "home," and the parts are in their normal positions, as in Figs. 7 and 7ª, the nose of the cam 40ᵇ rests on a fixed support 4ᶜ, on the frame, the hook 40ª being by this means elevated above the slot in the link 40. A spring, 40ᵉ, bears on the back of the hook. Now when the pull 9 is drawn out, the stud, 26ˣ, which engages the slot in the link and couples the latter to the lever 26, moves along the slot in the link until it reaches the end of the same, when it begins to move the link. The movement of the link soon carries the cam 40ᵇ off its support, and the hook 40ª then falls and engages the stud 26ˣ. When the pull 9 is pushed in again, the stud 26ˣ, by its engagement with the hook, carries the link back with it until the nose of the cam 40ᵇ strikes the support 4ᶜ and rides up on the same, when the hook will be raised and the stud 26ˣ freed. The latter will then move along the slot until it reaches the end of its travel. The support 4ᶜ may be of any kind; any stationary part of the frame will serve for the purpose. When the pull is fully drawn out, the toothed wheel 37, before referred to as being fixed on the pull spindle, will be moved into gear with the wheel, 37ª, of the adding mechanism, 38. I may say here that this latter mechanism is of the usual kind, and as it may be purchased in the market it will require no description further than to say that when the pull 9 has been rotated to the right to display the numerals of the sum received, is then drawn out until the wheel 37 gears with the wheel 37ª and is finally rotated back again to zero,—as it must be,—the sum received will be added up on the number wheels of this adding mechanism 38. After the pull 9 has been drawn out to the full extent it must, as just stated, be rotated back to zero, or the starting point, before it can be pushed in again. The device which compels this consists of a latch detent, 42, (seen best in Fig. 2) which is situated directly over the pull spindle, as here shown, and is arranged parallel therewith. The free end of this latch detent is situated near the inner face of the wheel 37ª. The wheel 37 has one deep notch, (see Fig. 4ª) which is so placed that, when the pull 9 is at zero,—that is, as seen in Fig. 1, with the cipher on the display wheel 13 at the aperture 11ª,—this deep notch will coincide or register with the latch detent, and it is only under these conditions that the pull can be pushed in when out; when the wheel 37 is turned until this deep notch is out of register with the latch detent, any attempt to push in the pull will cause the wheel to strike the free end of the latch. In order to stop the backward rotation of the pull at the proper point, a stop-piece, 37ᵇ, is fixed on the wheel 37 in position to impinge against the side of the detent latch when the deep notch is brought into coincidence with the latch and thus stop further rotation. When the pull is pushed in, however, the latch 42 will not prevent it from being drawn out so long as one of the notches in the wheel 37 registers with the latch, as on the lower edge of the latch there is a bevel or incline at the back which the wheel strikes and thus raises the latch. The notches in the wheel 37 correspond in number and arrangement with the push-pins 18, there being twenty of each. To prevent the pull from being pushed back when partly drawn out, and while the latch 42 is still in engagement with a shallow notch of the wheel 37, the lower edge of the latch is provided with several notches, as clearly seen in Fig. 2, these notches being beveled or inclined at one side so as to permit the wheel to pass from one to the other when the pull is drawn out, but having square shoulders at their other sides to prevent any inward movement of the pull. When the pull has been set, drawn out, and then turned back to zero, it is pushed in, and this movement serves to operate the feed rollers 30, and thus feed forward the strip 8 to an extent sufficient to form the ticket to be cut off.

The mechanism whereby the pushing in of the pull operates the feed rollers will now be described with especial reference to Figs. 3 and 5. On the upright rock shaft 28, is fixed a beveled segment rack, 43, which gears with a bevel wheel, 44, ratcheted on the journal of the lower feed roller 30. When the pull is pushed in, the said roller is rotated forward, and when it is drawn out, the wheel 44 rotates on the roller-journal without affecting the rollers. The ratcheting mechanism employed is best seen in Fig. 5, which is a vertical section taken in a plane back of the feed rollers and looking toward the rear of the machine. A four-toothed ratchet wheel 38ª, is keyed on the journal of the lower feed roller and the teeth of this wheel are engaged by a spring pawl, 44ª, carried by an arm, 44ᵇ, fixed to the wheel 44. Every time the pull 9 is drawn out this pawl recedes and engages the next succeeding tooth of the ratchet wheel, and every time said pull is pushed in the pawl advances the ratchet wheel one tooth. A spring stop-pawl, 38ᵇ, engages the teeth of the ratchet wheel and prevents backward rotation of the feed roller. The springs 38ᶜ, seen in Figs. 4 and 6, keep the upper feed roller pressed down upon the strip of paper.

I will now briefly describe the operation of the "dollar" pull, 10, seen at the left in Fig. 1, and in side elevation in Fig. 3. This pull is provided with a spindle 10ª, a carrier, 17ˣ, and push-pins, 18ˣ, arranged the same as before described with reference to the master pull. Rotation of the pull 10, operates a display wheel, 13ˣ, through the medium of an upright shaft 15ˣ, and miter gears 14ˣ and 16ˣ, precisely as before described with reference to the master pull, the numerals on the wheels 13ˣ appearing at the sight aperture 11. Rotation of this pull 10 is communicated to the "dollar" type wheel, 45, through the medium of a rack, 46, arranged transversely as seen in Fig. 6, and gearing with a toothed wheel 45ˣ, on the type wheel 45, and a toothed wheel 46ᵇ, splined on the spindle of the pull 10.

There are twelve push-pins 18ˣ in the carrier connected with the pull 10, for the nine digits, the cipher or zero, and for quart and pint sales; as the sums received for the two latter are usually other than five, ten or fifteen cents, these sums cannot be registered with the "cents" pull 9. I therefore provide for recording them with the "dollar" pull simply by name and not by amount. This is effected by providing the "dollar" type wheel 45 with the abbreviations "Qt." and "Pt." which are printed on the ticket in lieu of the sums received, whenever a quart or pint is sold.

In order to avoid operating the "dollar" adding mechanism 38ˣ, seen in Fig. 3, when a quart or pint is sold, the gear wheel, 37ˣ, on the spindle of the pull 10 is mutilated, so that this wheel, which would have normally twenty-four teeth, will not gear with the wheel 37ˣˣ of the adding mechanism when the pull is rotated, to an extent sufficient to register the quarts and pints on the adder. It is desirable to employ two like adding mechanisms or adders for the "dollars" and "cents," and to do this where one pull has twenty push-pins and the other twelve, the mutilated gear wheel 37ˣ is made to gear with a wheel 37ˣˣ, which has twenty four teeth and is loose on the arbor of the adding mechanism 38ˣ, but gears with a pinion, 47ˣ, which gears with a wheel, 47, with twenty teeth which is fixed on the arbor of the adding mechanism. The pull 10 is provided with a spring latch-detent 42ˣ, which performs the same functions as the latch detent 42, but it is arranged below the pull spindle 10ª and engages a deep "zero" notch (seen in dotted lines in Fig. 4) in the lower side of the gear wheel 37ˣ. In order to stop the pull 10 at zero when turned back after being drawn out, the spindle 10ª is furnished at its inner end with a detent, 48, in the form of a snail, the shoulder of which impinges on the upper free end of a spring latch, 48ª, pivotally mounted on the frame as seen in Fig. 4. In order to prevent this latch from interfering with the drawing out of the pull to its full extent, in case this should be attempted when the latch stands in the path of the extreme laterally projecting part of the snail detent 48, the latch is beveled laterally so that the detent will push it out of the way and wipe over or past it.

I will now describe the mechanism whereby the clock, 6, sets the "dating" and "time" type-wheels, premising that, as here shown, the "month" type-wheel, 49, is mounted to rotate on the pull spindle 9ª, and is set by hand. It is held against rotation merely by an ordinary spring stop-pawl. The "day" type-wheel, 50, the "hour" type-wheel, 51, and the "minute" type-wheel, 52, are mounted rotatively on the pull spindle 9ª, and are actuated or set by the clock through the medium of a triple pawl and ratchets. It may be explained here that for simplicity and convenience I have so arranged the "minute" type-wheel that it will be shifted at each fifteen minutes, or four times per hour, and have also utilized a wheel connected with the hour wheel 51 to print on the ticket the abbreviations "A. M.," "P. M.," "N." and "M.," signifying the morning, afternoon, noon and midnight.

The mechanism for operating the type-wheels from the clock will be readily understood from Fig. 4, and the enlarged detail views, Figs. 9 to 12, inclusive. Just back of the clock 6,—which is not illustrated in detail, as it may be of the usual kind,—is arranged a transverse pawl arm, 62, which is pivoted to the frame at one end and carries at its other end a triple hook pawl 53. A spring, 62ª, is attached to the pawl arm and imparts to it an upward, operative movement.

The pawl arm has on its upper side a vertical shoulder 62ᵇ (see Fig. 9), and on an arbor, 54, of the clock mechanism which makes one complete rotation each hour, is fixed a four-toothed cam-wheel, 55, which wheel is arranged to impinge on and depress the pawl arm at the shoulder and allow it to be drawn up again by its spring, once every fifteen minutes. The cam wheel rotates in the direction indicated by the arrow in Fig. 9, and when a tooth passes off the shoulder on the arm, the latter is instantly drawn up by its spring.

Fig. 9 shows the "day" type-wheel 50, and its ratchet wheel, 50ˣ, which is fixed to the wheel and has thirty-one teeth. This view also shows the shortest hook, 53ª, on the triple pawl, engaging with the teeth of this ratchet wheel.

Fig. 11 shows the "hour" type-wheel, 51, and its ratchet wheel, 51ˣ, which is fixed to the type-wheel and has twenty-four teeth. This view also shows the next longest hook, 53ᵇ, of the triple pawl engaging the teeth of this ratchet wheel.

Fig. 12 shows the "minute" type-wheel 52, and its ratchet wheel, 52ˣ, which is fixed to the type-wheel and has also twenty-four teeth. This view also shows the longest hook, 53ᶜ, of the triple pawl engaging the teeth of this ratchet wheel.

Figure 1:
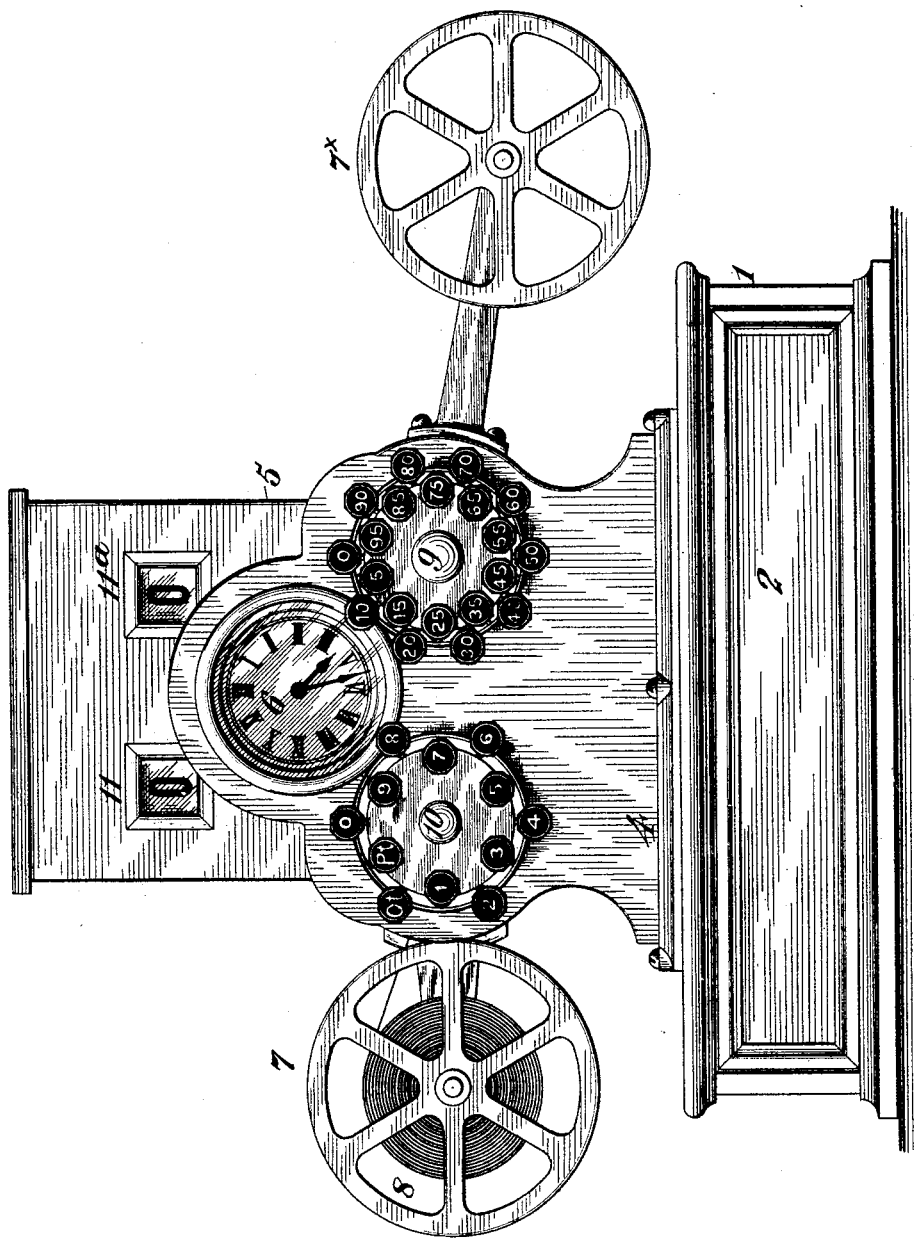

The teeth on the ratchet wheel 52ˣ (Fig. 12) each represent fifteen minutes, and at every fourth tooth is a deep notch, 52ˣˣ, into which the long hook of the pawl drops at every hour and thus allows the next longest hook on the pawl to fall behind and engage a tooth on the ratchet of the "hour" type-wheel, which will then be advanced one tooth by the next movement of the pawl arm 62. When the hour type-wheel shall have made a complete rotation, the hook 53ᵇ of the triple pawl (see Fig. 11) will drop into the one deep notch, 51ˣˣ, in the ratchet wheel 51ˣ, and allow the shortest hook of the pawl to engage the teeth of the ratchet wheel of the "day" type-wheel 50, and advance this wheel to the extent of one tooth. In months with less than thirty-one days, the "day" wheel will be advanced by hand at the end of the month, where an ordinary clock is employed. The several ratchet wheels will be stopped against backward rotation by ordinary spring stop-pawls, as seen at 56, in Fig. 9.

Figs. 9, 11 and 12 show the hooks of the triple pawl all in engagement, as they will be at midnight.

Fig. 10 is a front view of the type-wheels and the ratchet mechanism for operating them.

As the pawl is apt to jump or slip out of the ratchet teeth on the sudden upward movement of the pawl, I employ to prevent this the construction best seen in Fig. 9. The pawl 53 has a slightly tapering shank and is held up to the ratchet wheels by a spring 53ˣ. Its hooks engage the teeth of the ratchet wheels below the common axis of the latter, so that when the pawl arm 62 rises the pawl is swung outward slightly. An arm, 57, fixed adjustably on a rod of the frame above, has a stop pin, 57ˣ, which takes behind the pawl and prevents it from flying out as the pawl is carried up. The taper of the pawl compensates for its outward movement toward said pin. The arm may be adjusted so as to set this stop pin very accurately. The type, 58, which prints the division mark or bar between the "cents" of the purchase and the month numeral, seen in Fig. 13 between the numerals "65" and "9," is arranged between the "cents" type-wheel 24, and the "month" type-wheel 49, being supported on the boss of the type-wheel and on the rod of the frame which carries the stop pawls 56, as seen mainly in dotted lines, in Fig. 9. The type for printing the letters "D. C." on the ticket will be on an L-shaped branch from the type 58.

Figure 3:
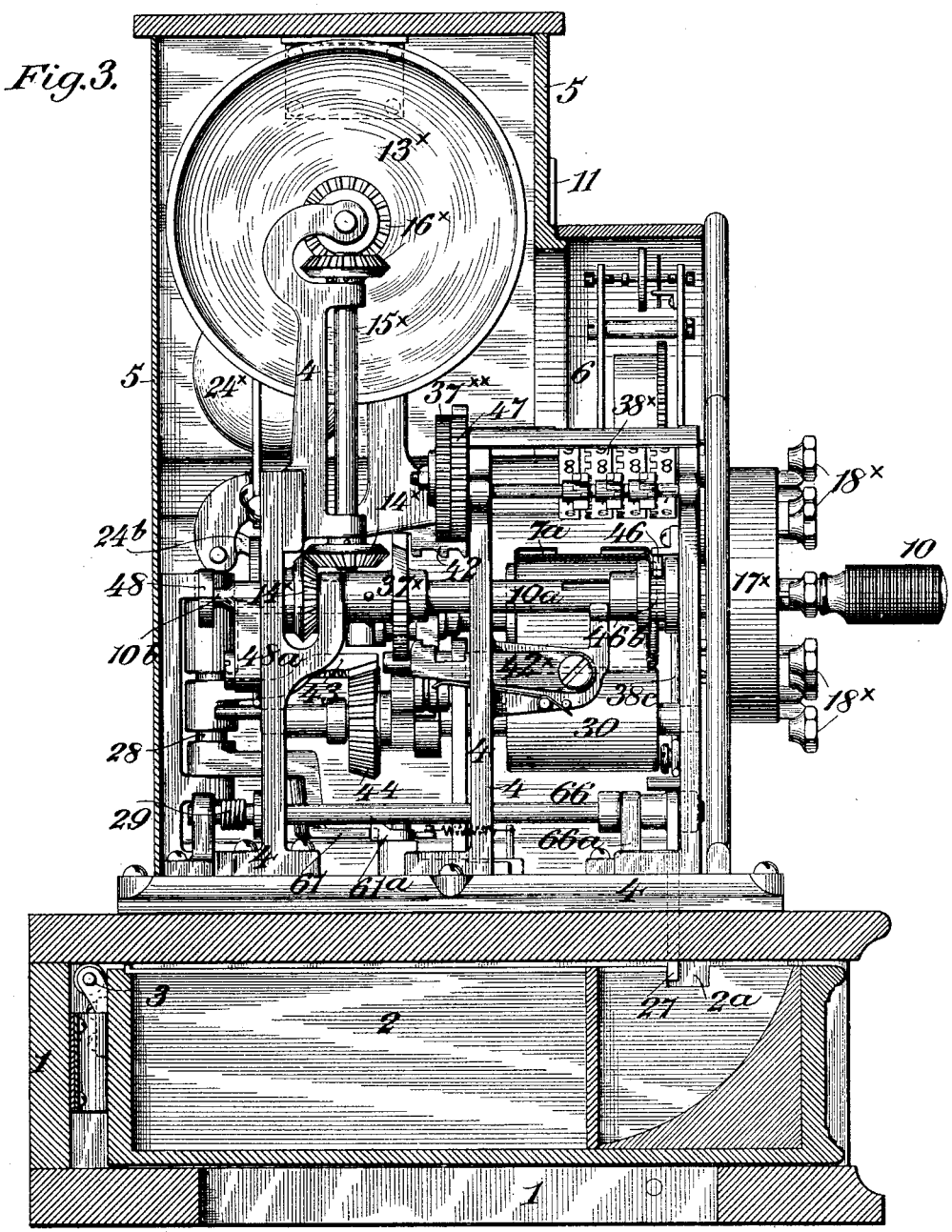
Figure 5:
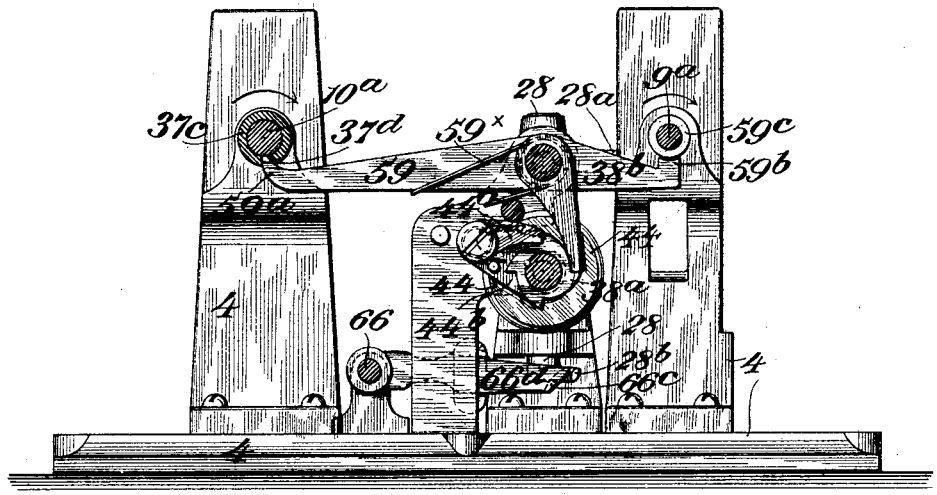
Figure 6:
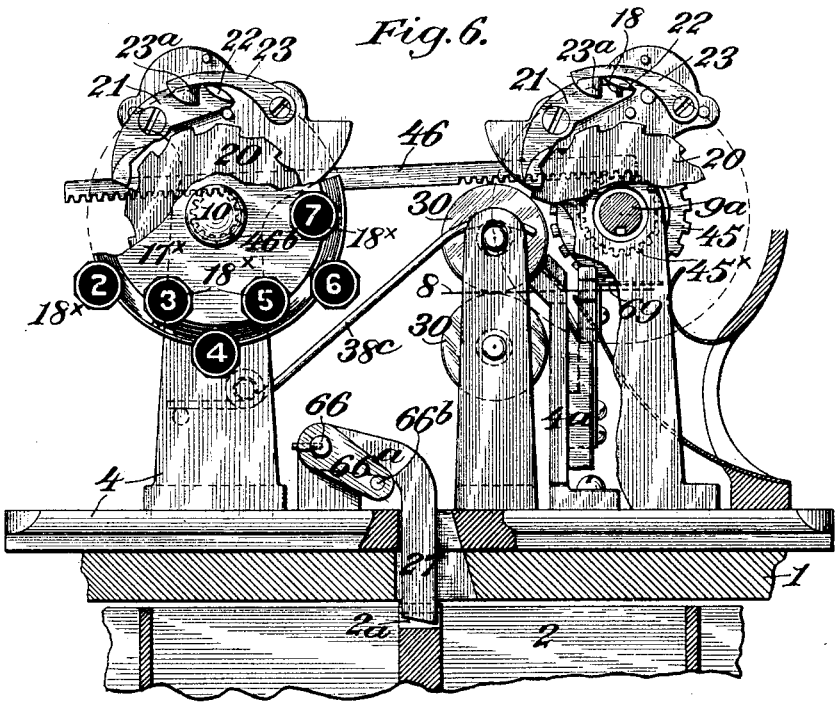

There are some features which govern the operations of the respective pulls and compel the attendant to operate them in a certain order or way. For example, the "dollar" pull 10 cannot be operated after the master pull 9 is drawn out and before the latter is rotated. I will describe the mechanism which governs this with especial reference to Figs. 4ᵇ, 4ᶜ and 5. A transversely arranged pawl-lever, 59, is fulcrumed, for convenience, on the journal of the upper feed roller 30, and its upturned ends take respectively, under the pull spindles 9ᵃ and 10ᵃ. There is a slot, channel, or recess 37ᵈ in the boss, 37ᶜ, of the wheel 37ˣ, (see Fig. 4ᶜ) on the spindle 10ᵃ, which channel is normally engaged by the toe, 59ᵃ, on the lever 59, which latter is kept pressed upward at this end by a spring, 59ˣ. This toe 59ᵃ is beveled in the manner of a pawl, so that the pull spindle 10ᵃ may be turned to the right, the margin of the channel pushing back the lever, if the toe, 59ᵇ, on the other end of the lever registers with a recess, 59ᶜ, (see Fig. 4ᵇ) in the pull spindle 9ᵃ, into which the toe may rise when the opposite end of the lever is depressed. When the pull 9 is drawn out the recess 59ᶜ no longer registers with the toe 59ᵇ, the lever cannot rock, and the toe 59ᵃ locks the pull 10 against rotation. On the other hand, if the "dollar" pull 10 be rotated, the master pull 9 cannot be drawn out, as the toe 59ᵇ will then engage the recess 59ᶜ by reason of the toe 59ᵃ having been forced out of the slot 37ᵈ at the pull 10. After the pull 10 has been drawn out, however, the pull 9 may be drawn out, as the drawing out of the pull 10 carries the boss of wheel 37ˣ forward clear of the toe on the lever and allows the lever 59 to rock and withdraw the toe 59ᵇ from the recess in the pull spindle 9ᵃ. As the toe 59ᵃ on the lever 59 registers with and engages the channel or slot 37ᵈ in the wheel boss 37ᶜ, when the pull 10 is turned to zero, it follows that, after the pull is turned and drawn out, it must be turned back to zero before it can be again pushed in. When both pulls have been drawn out, the "dollar" pull 10 must be pushed in first in order to free the master pull 9, and allow it to be pushed in. The mechanism controlling this is best seen in Figs. 3, 4 and 4ᶜ. A transversely arranged lever, 60, is fulcrumed on the frame at the back of the apparatus; this lever has an upturned toe, 60ᵃ, which takes under the pull spindle 10ᵃ, and a downwardly turned toe, 60ᵇ, which takes over the pull spindle 9ᵃ. A spring, 60ˣ, bears on the end of the lever next to the pull spindle 9ᵃ, and by pressing down on this end of the lever keeps the toe 60ᵃ, at the opposite end pressed upward in contact with the pull spindle 10ᵃ. This contact serves to hold the toe 60ᵇ out of engagement with the groove 9ᵇ, in the rear end of the spindle 9ᵃ when the pulls are both pushed in, but if both are drawn out, the toe 60ᵃ will occupy a recess or circumferential groove, 10ᵇ, (seen best in Fig. 4ᶜ) formed by reducing the diameter of the spindle 10ᵃ, and the toe at the opposite end of lever 60 will occupy the groove 9ᵇ in the other pull spindle, 9ᵃ, and prevent the master pull from being pushed in. Owing to the taper or incline at the front side of the groove 10ᵇ, the pull 10 may be pushed in and this will release the pull 9. The lever 60 does not prevent rotation of the master pull under the conditions stated above.

Figure 2:
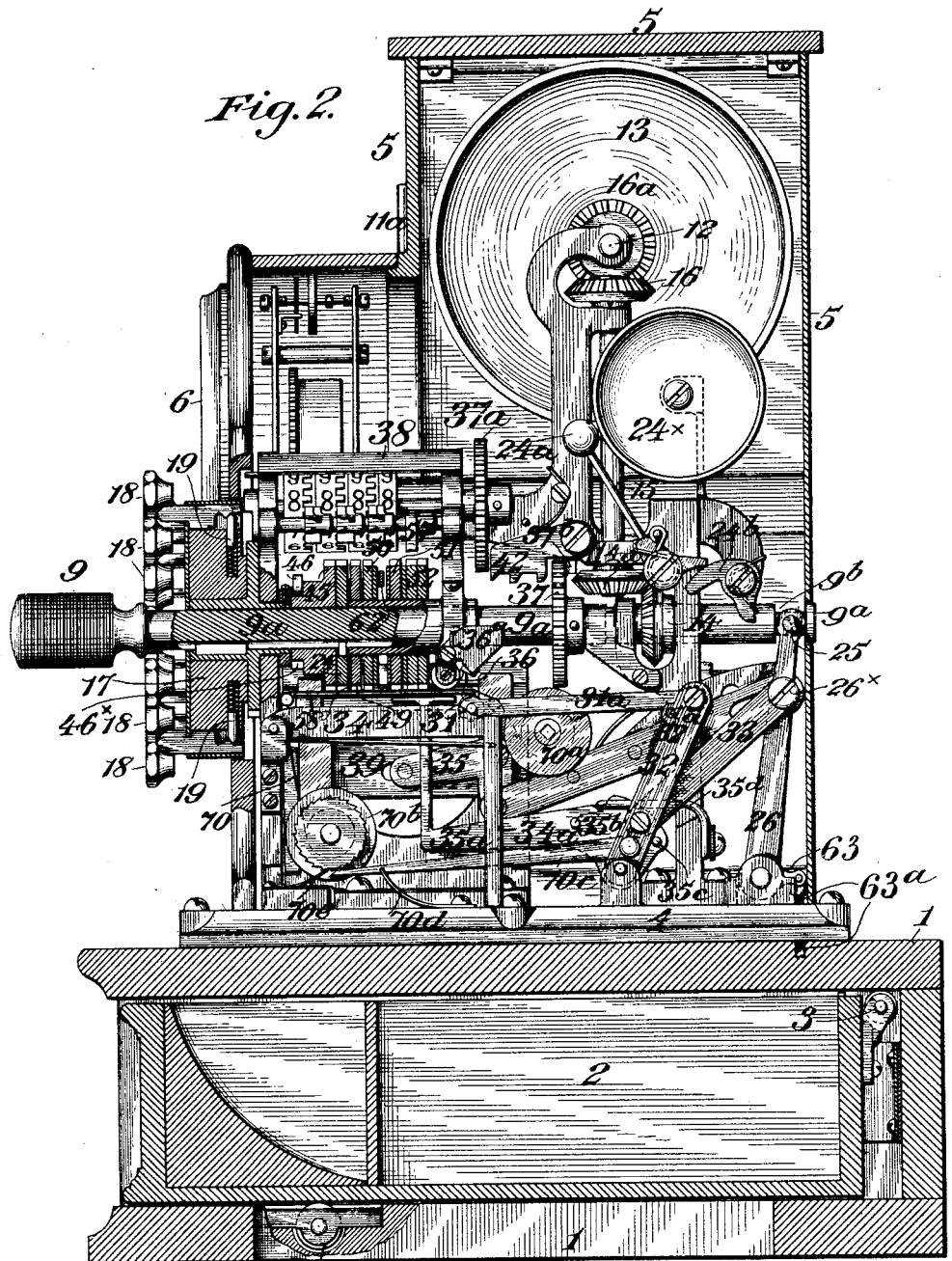

In Fig. 8 I have shown, in plan, a device to prevent the pulling out of the master pull 9 when only partly pushed in. The device is also seen in side elevation in Fig. 3. On the upright rock shaft 28, near its foot, is secured a ratchet segment, 61, which has somewhat V-shaped notches between its teeth, and on the base of the frame is pivotally mounted a V-shaped pawl, 61ᵃ; this pawl has a spring, 61ᵇ, which holds it normally in the position seen in Fig. 8, with the point of the pawl, its pivotal axis, and the shaft 28, in a right line. The position of the pawl is also such that when the pull 9 is pushed half-way in, this right line will bisect the segment 61. The pawl projects so far into the path of the segment teeth that when engaged therewith it occupies an oblique position and the segment must be moved in either direction far enough to clear the pawl and allow the latter to right itself before the segment can be moved in the opposite direction. Thus the pawl prevents the pull from being drawn out after having been pushed in part way. When the master pull is drawn out, it cannot be again pushed in until the drawer 2 is pushed in. The device which prevents this is seen in Figs. 2 and 14, the latter view illustrating the construction most fully and clearly. To a short arm, 63, on the lever 26, is coupled the upper end of a bolt, 63ᵃ, which extends down through an aperture in the top of the drawer-casing 1; and when the drawer is pushed in, and the pull 9 is also pushed in, the lower extremity of this bolt engages an aperture in a slide, 64, mounted in the casing and also a recess or hole, 65, in the upper face of some part of the drawer. Now when the pull 9 is drawn out and the lever 26 thus rocked forward, the lower end of the bolt 63ª, which will be raised, will stand just above the level of the plate 64; and when the drawer is pushed out by its spring, the spring 64ª of the slide plate will push the latter forward under the bolt until the slide is stopped by a supporting bracket and stop 67. This movement of the slide puts the aperture 65 out of register with the bolt, and consequently, if the operator attempts to push in the pull 9, the bolt 63ª will impinge on the slide and prevents any movement inward of the pull. When the drawer is pushed in, its inner end, or some part of it, strikes a shoulder on the slide and pushes it back until it assumes the position seen in Fig. 14, when the bolt can enter the socket in the drawer and the pull may then be pushed in.

Having thus described my invention, I claim—

1. In a cash register, the combination with a pull and its spindle, capable of rotation and endwise movement, type-wheels on the spindle of the pull for printing the amount received and the time of its receipt, on a strip or piece of paper, means, operated by the pull, for feeding said paper under the type-wheels, an inking ribbon, a clock, mechanism between the clock and the type-wheel or wheels which print the time, whereby the former rotates and sets the latter intermittently, an impression roller, and means intermediate between said impression roller and the pull whereby the drawing out of the latter effects the printing, substantially as set forth.

2. In a cash register, the combination with a pull and its spindle, the type-wheels 50, 51 and 52, mounted on said spindle, the ratchet wheels fixed to said type-wheels, as described, the triple pawl 53, having hooks of different lengths engaging the teeth of the respective ratchet wheels, the pawl arm 62, and its spring, the clock, and the cam-wheel 55, mounted on an arbor of the clock and arranged to act on the arm 62, substantially as set forth.

3. In a cash register, the combination with a pull and its spindle, type-wheels mounted on said spindle, an inking ribbon for printing from said wheels, a plate 69, arranged under the ribbon and type, a flanged, pivotally mounted track, 34, to support and guide the impression roller, the said impression roller, mechanism between the said roller and the pull whereby the roller is operated by the drawing out of the pull, and means for feeding paper into position to be printed upon, substantially as set forth.

4. In a cash register, the combination with the pull and its spindle, of the carrier, 17, the push-pins, 18, mounted therein and provided with heads having numerals marked thereon, the ratchet wheel 20, rotating with the carrier 17, and the pawl 21, pivotally mounted on the frame with its head adapted to engage the ratchet wheel, said pawl having a cam-stud 22, on its tail arranged in the path of the push-pins when the latter are pushed in, whereby the said pins serve to put the nose of the pawl into engagement with the ratchet teeth, substantially as set forth.

5. In a cash register, the combination with the pull and its spindle, of the carrier 17, the push-pins mounted therein and adapted to be pushed in and drawn out to a limited extent, and the latch 23, pivotally mounted on the frame with its beveled head in the path of the protruding ends of the pins whereby they will wipe under and raise the latch when the pull is rotated forward, said latch-head having a lateral bevel or incline, 23ª, in the path of the pins, whereby the pins are pushed outward when the pull is rotated backward, substantially as set forth.

6. In a cash register, the combination with the pull and its spindle, of the carrier 17, splined thereon, the push-pins 18, mounted in the carrier and each having in it two recesses, the spring detent 19, mounted in the carrier and adapted to engage one of said recesses when the pin is pushed in and the other when it is pulled out, and means, operated by the push-pins for arresting the forward rotation of the pull, substantially as set forth.

7. In a cash register, the combination with a pull and its spindle, feed rollers for feeding a strip of paper to a cutter, and mechanism intermediate between the pull and said rollers whereby they are operated when the pull is pushed in, of a cutter to sever a piece from the strip, comprising a frame, a stationary blade, and a movable blade, 39, mounted in guides on the frame, and mechanism between the pull spindle and the blade 39 for operating the latter, said intermediate mechanism comprising the lever 26, connected with the pull spindle in a manner to be rocked by the latter in its movements, the elbow lever 41, coupled at one end to the cutter blade, the link 40, coupled at one end to the lever 41 and having a slotted connection at its other end to the lever 26, the spring hook 40ª, pivoted to the link 40 and its hooked end adapted to engage the coupling stud 26ˣ, on the lever when the latter is rocked forward, the cam 40ᵇ, carried by the hook 40ª, and a fixed support in the path of said cam when the lever is rocked backward, whereby the hook is freed from the stud 26ˣ, as set forth.

8. In a cash register, the combination with the casing, the cash drawer mounted therein; a pull, and its spindle, of the rock-shaft 66, the loosely hung latch 27, engaging a locking recess in the drawer, means whereby the rocking of the shaft 66 in one direction lifts said latch, the upright rock shaft 28, operated by the pull, the radially projecting stud 28ᵇ on said shaft 28, the arm, 66ᵈ, on the shaft 66, provided with an inclined cam 66ᵉ, in the path of the stud 28$^b$, and the springs which hold the arm 66$^d$ in an intermediate normal position, substantially as set forth.

9. In a cash register, the combination with a master pull, a type wheel 45 mounted rotatively on the spindle thereof, a dollar pull, means for communicating the rotary movement of the latter pull to the type wheel 45, mechanism for feeding a strip of paper under said type wheel and for producing the impression, said mechanism being actuated by the master pull, an adding mechanism 38$^x$, for the "dollars," and a mutilated gear wheel, 37$^x$, fixed on the spindle of the dollar pull and adapted to be put in gearing position with said adding mechanism when the dollar pull is drawn out, whereby only a portion of the backward rotation of the dollar pull is communicated to the adding mechanism, for the purpose set forth.

10. In a cash register, the combination with a pull and its spindle, type wheels mounted on the spindle of the pull, mechanism, operated by the pull for feeding a strip of paper under the type wheels, an impression roller, 31, operated by the pull, and a track for said roller, of means substantially as described for holding up the strip of paper until the impression roller takes under it, and means, operated by the pull, for severing the printed ticket from the strip, substantially as set forth.

11. In a cash register, the combination with the pull 10, and its spindle, adapted to be rotated and moved endwise, of the display wheel 13$^x$, the intermediate gearing whereby the rotation of the pull is communicated to said display wheel, the beveled spring latch 48$^a$, mounted on the frame adjacent to the pull spindle, and the stop cam 48, on the said spindle, adapted to impinge on the latch and arrest the backward rotation of the pull, when the latter is drawn out, substantially as set forth.

12. In a cash register, the combination with the master pull and its spindle, the latter having in it a circumferential recess, 9$^b$, and the pull 10, and its spindle, the latter having in it a recess 10$^b$, of the transversely arranged lever 60, having at one end a toe 60$^a$, which engages the recess 10$^b$ when the pull 10 is drawn out and at its other end a toe 60$^b$, which engages the recess 9$^b$ when the master pull is drawn out, and a spring which tends to put the toes of the lever into engagement with said recesses, substantially as set forth.

13. In a cash register, the combination with the master pull and its spindle, the latter having in it a circumferential recess 59$^c$, the pull 10, and its spindle, the wheel 37$^x$, on the latter spindle, having in its boss or hub a longitudinal channel in 37$^d$, a transversely arranged pawl-lever, 59, the nose, 59$^a$, of which is held normally in engagement with said channel by a spring 59$^x$, and the said spring, the nose 59$^b$, on the opposite end of the lever-pawl registering with a circumferential recess, 59$^c$, in the spindle of the master pull, substantially as set forth.

14. In a cash register, the combination with the casing, the cash-drawer mounted therein, the pull, a lever coupled to the pull and adapted to be vibrated by the movements of the latter, and a bolt, 63$^a$, coupled to and operated by said lever, of a movable socket-piece operated by the drawer and adapted to receive said bolt when the drawer is pushed in, and means for moving said socket-piece until the socket is out of register with said bolt when the pull and drawer are out, whereby the operator is prevented from pushing in the pull until the drawer is pushed in, as set forth.

In witness whereof I have hereunto signed my name in the presence of two subscribing witnesses.

GEORGE BOEMERMANN.

Witnesses:
HENRY CONNETT,
GEO. W. STEPHENS.